Figure 1:
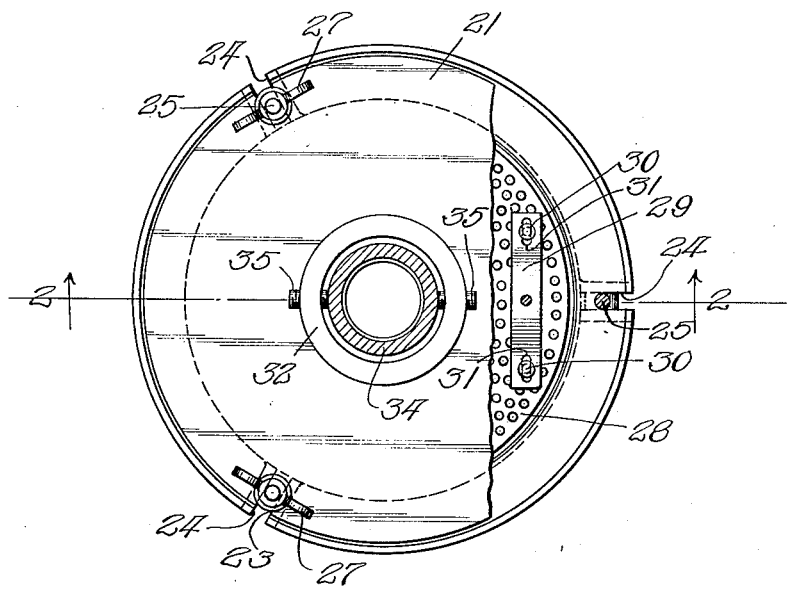

Nov. 3, 1931.  A. C. KRACKLAUER  1,830,664

FILTER

Filed Nov. 14, 1929

Inventor:
Aloysius C. Kracklauer,
By Banning & Banning
Attys.

Patented Nov. 3, 1931

1,830,664

UNITED STATES PATENT OFFICE

ALOYSIUS C. KRACKLAUER, OF CHICAGO, ILLINOIS

FILTER

Application filed November 14, 1929. Serial No. 407,043.

This invention relates to filters, and particularly to filters which are adapted to be attached to faucets to filter the water issuing therefrom.

One of the objects of the invention is to provide a filter of this type which is cheap and simple to construct, is efficient and durable in use and is capable of being readily disassembled for renewal of the filter medium.

A further object of the invention is to provide an improved filter wad which can be readily removed and replaced, and which is capable of giving efficient service for protracted periods of time.

A further object of the invention is to provide a filter of this type which can be very readily removably attached to faucets of varying shapes.

Other objects, advantages and capabilities will later more fully appear.

My invention further resides in the combination, construction and arrangements of parts illustrated in the accompanying drawings, and while I have shown herein a preferred embodiment, I wish the same to be understood as illustrative only and not limiting the scope of my invention.

Figure 2:
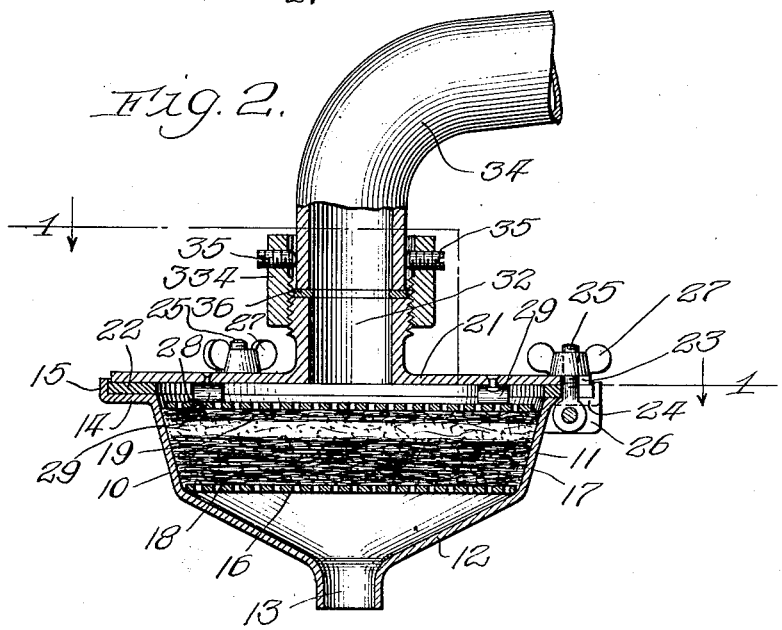

In the drawings:

Figure 1 is a sectional plan view of a filter constructed according to my invention on the line 1—1 of Fig. 2, and Fig. 2 is a sectional elevation on the line 2—2 of Fig. 1.

Referring to the drawings, the filter comprises a receptacle 10, having a main portion 11 of a frustro-conical shape. The portion 11 gives into a bottom 12 which is funnel shaped and terminates in a central discharge nozzle 13. The upper edge of the portion 11 gives into a horizontal flange 14 the outer edge of which is upturned at 15. Within the receptacle 10, at the bottom of the frustro-conical portion 11, is provided a foraminous plate 16 which serves to support the filter wad 17. The foraminous plate 16 is preferably permanently attached to the receptacle 10, although it may be removable if desired.

The filter wad 17 is frustro-conical in shape so as to fit snugly into the portion 11 of the receptacle 10.

The filter wad 17 is preferably a composite wad comprising a relatively thick lower layer 18 of fibrous material, a relatively thin intermediate layer 19 of finely divided or granular material and a relatively thin upper layer 20 of fibrous material. The fibrous material employed is preferably the so-called filter pulp, which normally consists of cotton fibers, although pulp of other fibers may be employed. The intermediate layer 19 may consist of any granular or finely divided filtering material and is preferably mixed with a small quantity, for example, five or ten per cent, of the fibrous material so that it may be bonded or matted together and to the upper and lower layers 18 and 20. It is preferred to employ silica-gel, such as Silocel or Filtercel, although other adsorbent materials such as kieselguhr, animal charcoal and the like may be employed if desired.

In manufacturing the filter wad the layer 18 may suitably be formed by imposing upon the plate 16 a suitable quantity of filter pulp suspended in water or other liquid. Sufficient pulp is employed so that when the liquid drains away, a continuous layer 18, of suitable thickness, remains. The intermediate layer 19 may be formed in the same way, employing a suspension of the powdered adsorbent filter medium together with a small quantity of fibrous binder in a suitable liquid. The superior layer 20, of fibrous material, is applied in the same way. While the filter wad may be produced in situ in the receptacle 10, it is preferred to prepare the filter wad as an article of commerce in different vessels of appropriate shape. When the wads are produced separately as refills, it is preferred to employ a mould somewhat larger than the vessel 11 so that the wads will fit snugly in the chamber 11 notwithstanding contraction owing to drying. On becoming wet in the filter, the wad tends to enlarge so that a tight fit is secured. In preparing the wads in this way it is preferred to subject the wads to pressure so as to compact same and express a substantial quantity of liquid.

The receptacle 10 is closed by a removable cover 21 which extends over the flange 14, a suitable gasket 22 of resilient material, such as rubber, being interposed therebetween. The cover 21 is provided near its edge with a plurality of radial slots 23 which are adapted to register with similar slots 24 in the flange 14. Bolts 25, pivoted in lugs 26 carried by the receptacle 10 are adapted to be moved into the registering slots 23 and 24 and co-operate with wing nuts 27 whereby the cover 21 may be firmly bolted to the receptacle 10 in water tight relation. A foraminous plate 28 is applied to the filter wad 17 and is adapted to be pressed thereon by the cover 21. Preferably the plate 28 is permanently and resiliently attached to the cover 21. This attachment may be attained by means of leaf springs 29 carried on the underside of the cover 21 and bearing upon the upper surface of the plate 28. Said plate 28 is provided with rivets or pins 30 which extend through slots 31 in the springs 29 to permit a limited movement between said rivets and springs. It will be understood that when the cover 21 is applied as previously described, the plate 28 will be located upon the upper surface of the filter wad 17 and will be pressed firmly thereon by means of the springs 29.

The cover 21 carries an upstanding nipple 32 by means of which water to be filtered is supplied to the upper side of the filter wad 17. Said nipple 32 carries means whereby the filter may be attached to faucets of conventional form. Such means preferably comprise an internally threaded collar 33 which is adapted to surround the discharge outlet 34 of a faucet and be attached thereto by means of set screws 35, which are preferably diametrically opposed. The nipple 32 is exteriorly threaded for connection with the collar 33 so as to bring the upper end of said nipple into abutment with the edge of the discharge outlet 34. A resilient gasket 36, suitably of rubber is interposed between the abutting edges to make a leak tight joint. Owing to the opposite location of the set screws 35 the nipple 32 is enabled to sit squarely upon the seat provided by the edge of the discharge outlet 34. It will readily be understood that this mounting enables the filter to be applied to faucets having discharge outlets of varying cross-section, provided the upper edge of the nipple 32 is sufficiently large to provide the necessary abutment for the discharge outlet 34.

I claim:

1. In combination, a filter of the type described, comprising an exteriorly threaded nipple for the introduction of water to be filtered, a collar adapted to surround the discharge end of a faucet, means pivotally connecting said collar thereto, said collar being internally threaded to receive said nipple and permit same to make a water tight joint with said discharge end.

2. In combination, a filter of the type described, comprising an upstanding inlet nipple, a collar adapted to surround the discharge end of a faucet, diametrically opposed set screws mounted in said collar and adapted to engage said discharge end to pivotally attach said collar thereto, said collar and nipple being provided with means whereby said discharge end and said nipple may be maintained in water tight abutting relation.

3. A composite filter wad comprising a layer of granular filtering material and outer layers of fibrous filtering material, and means intermingled with the granular filtering material for bonding said granular filtering medium together and to the outer fibrous layers.

4. A composite filter wad comprising a layer of granular filtering material and outer layers of fibrous filtering material, said granular layer comprising a small amount of fibrous material whereby same is bonded together and to said fibrous layers.

5. A composite filter wad comprising a layer of granular silica-gel, and outer layers of filter pulp, said layer of silica-gel comprising a small amount of filter pulp whereby same is bonded together and to said outer layers.

6. The method of producing composite filter wads, which consists in applying fibrous filtering material in liquid suspension upon a foraminous plate, withdrawing liquid therefrom, applying granular filtering material upon the layer of fibrous material thus formed, applying fibrous filtering material in liquid suspension upon the granular layer and removing liquid from the filter wad.

7. The method of producing composite filter wads, which consists in applying a filter pulp suspended in liquid upon a foraminous plate, withdrawing liquid therefrom, applying granular silica-gel intermixed with a small quantity of fibrous material upon the layer of fibrous material thus formed, applying filter pulp in a liquid vehicle upon the granular layer and removing liquid from the filter wad.

In testimony whereof, I have hereunto set my hand this 8th day of November, 1929.

ALOYSIUS C. KRACKLAUER.